United States Patent
Horn et al.

(10) Patent No.: US 9,749,309 B2
(45) Date of Patent: Aug. 29, 2017

(54) IDENTITY MANAGEMENT SYSTEM

(75) Inventors: Günther Horn, Munich (DE);
Wolf-Dietrich Moeller, Munich (DE);
Hariharan Rajasekaran, Dossenheim (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 475 days.

(21) Appl. No.: 13/124,045

(22) PCT Filed: Sep. 12, 2008

(86) PCT No.: PCT/EP2008/062153
§ 371 (c)(1),
(2), (4) Date: Apr. 13, 2011

(87) PCT Pub. No.: WO2010/028691
PCT Pub. Date: Mar. 18, 2010

(65) Prior Publication Data
US 2011/0202986 A1  Aug. 18, 2011

(51) Int. Cl.
*H04L 29/06* (2006.01)
(52) U.S. Cl.
CPC ...... *H04L 63/0815* (2013.01); *H04L 65/1016* (2013.01)
(58) Field of Classification Search
CPC .................. H04L 63/0815; H04L 63/1016
USPC ........................................................ 726/7
See application file for complete search history.

(56) References Cited

U.S. PATENT DOCUMENTS

| | | | |
|---|---|---|---|
| 2004/0128544 A1* | 7/2004 | Hondo et al. | 713/201 |
| 2004/0187031 A1* | 9/2004 | Liddle | 713/201 |
| 2006/0021019 A1 | 1/2006 | Hinton et al. | |
| 2008/0120705 A1* | 5/2008 | Beyer et al. | 726/5 |
| 2010/0306773 A1* | 12/2010 | Lee | G06F 9/5077 718/1 |

FOREIGN PATENT DOCUMENTS

WO 2008/082337 7/2008

OTHER PUBLICATIONS

Digital cellular telecommunications system (Phase 2+); Universal Mobile Telecommunications System (UMTS); IP Multimedia Subsystem (IMS); Stage 2 (3GPP TS 23.228 version 8.5.0 Release 8), ETSI TS 123 228 V8.5.5 (Jun. 2008), pp. 1-97.

(Continued)

*Primary Examiner* — Kambiz Zand
*Assistant Examiner* — Ghodrat Jamshidi
(74) *Attorney, Agent, or Firm* — Squire Patton Boggs (US) LLP

(57) ABSTRACT

A system comprising an IMS network (104), an adapter module (106), an identity provider (108) and an application (110) is described. The adapter module (106) is within an IMS trust domain. The application (110) is within the trust domain of the identity provider. A user of the system can access the application (110) via the IMS network (104), regardless of whether the application is within the IMS trust domain, by making use of the adapter module (106) to obtain the user's user credentials for the application from the identity provider.

19 Claims, 7 Drawing Sheets

(56) References Cited

OTHER PUBLICATIONS

Digital cellular telecommunications system (Phase 2+); Universal Mobile Telecommunications System (UMTS); Liberty Alliance and 3GPP security interworking; Interworking of Liberty Alliance Identity Federation Framework (ID-FF), Identity Web Services Framework (ID-WSF) and Generic Authentication Architecture (GAA) (3GPP TR 33.980 version 7.6.0 Release 7) ETSI 133 980 V7.6.0 (Oct. 2007), pp. 1-39.
3rd Generation Partnership Project; Technical Specification Group Services and System Aspects; 3G security; Access security for IP-based services (Release 7), 3GPP TS 33.203 V7.5.0 (Mar. 2007), pp. 1-65.

\* cited by examiner

IDENTITY MANAGEMENT SYSTEM

The present invention relates to identity management and identity federation.

An identity can be a name that is unique within a system which is assigned to an entity interacting with or present in the system. This "name" can, for example, be a string, a number or an email identity that is assigned to an entity such as a user or a program of a system. A simple example of an identity is a telephone number assigned to an individual in a telephone network. Identity federation concerns associating different identities of the same user with one another (e.g. understanding that the identity john.doe@mail.com is associated with the entity behind the telephone number 1234567).

Identity federation enables, amongst other things, a user to perform a single login operation in order to log in to a number of separate applications, each having separate login arrangements (often referred to as "single sign on").

The concept of identity federation and Single-Sign-On (SSO) solutions for Internet applications is well known and a number of bodies have addressed the issue. Exemplary solutions to the problem of identity federation are provided by the Liberty Alliance Project® (see http://www.projectliberty.orq), Shibboleth (see http://shibboleth.internet2.edu) and OpenID® (http://openid.net).

By way of example, in Liberty Alliance, Service Providers (SP) and Identity Providers (IDP) are organised as Circles of Trust (CoT). A CoT is a federation of service providers that have business relationships based on Liberty architecture and operational agreements and with whom users can transact business in a secure and apparently seamless environment. Two CoTs can be combined together by federating their respective IDPs; such a combination is described below with reference to FIG. 1.

FIG. 1 shows a first Identity Provider 2 and a second Identity Provider 4. First 6, second 8, third 10 and fourth 12 service providers (SPs) form a first Circle of Trust (CoT) 14 with the first Identity Provider 2. Thus, a user that is trusted by one of the service providers 6, 8, 10 and 12 will be, trusted by the other service providers within the CoT 14. Similarly, fifth 16, sixth 18, seventh 20 and eighth 22 service providers form a second Circle of Trust 24 with the second Identity Provider 4.

The two Circles of Trust 14 and 24 can be combined by federating the respective Identity Providers 2 and 4. This enables a user that is trusted by one of the service providers 6, 8, 10 and 12 to also be trusted by the service providers 16, 18, 20 and 22.

The process of identity federation in Liberty Alliance is explained below with reference to a simple example.

FIG. 2 is a block diagram showing a user 30, an identity provider (IDP) 32, an airline application 34 and a hotel application 36. Assume initially that the user 30 wants to book a flight to and a hotel in London. In order to do so, the user 30 wishes to use the airline application 34 to book the flight and the hotel application 36 to book the hotel. Assume that the airline application 34 and the hotel application 36 belong to the same Circle of Trust (CoT) and are served by the IDP 32.

The user 30 has an account at the IDP 32 under the name "John_IDP", an account at the airline application 34 under the name "John_Airline", and an account at the hotel application 36 under the name "John_Hotel". Each account has a separate login arrangement, including a username and a password.

In order to make the booking, the user 30 would like to be able to login to his account at the IDP 32 and to be able to access his accounts at both the airline application 34 and the hotel application 36 without the need to enter separate login details to access those applications.

The general procedure to allow such access involves federating each of the user's accounts at the IDP 32. There are a number of ways of achieving this that are known in the art. One simple method is described below with reference to FIG. 3: the skilled person would be aware of many other methods that would also be suitable.

First, the user 30 logs in at the IDP 32 using his local account (e.g. entering his username and password). The IDP 32 provides access to a list of services within the Circle of Trust of the IDP (including the airline and hotel applications of this example, but potentially including other applications) and offers the user 30 the opportunity to federate his accounts at those services (if he has any). In the example of FIG. 3, the IDP 32 specifically asks the user 30 if he wants to federate his account at the airline 34 with the IDP 32.

The user 30 can then select the service he wishes to federate. In the example of FIG. 3, the user indicates that he does want to federate his account at the airline application 34 with the IDP 32.

In response to the request for the user's airline account to be federated, the IDP 32 redirects the user to the airline application. In response, the airline application 34 asks the user to authenticate himself. In response, the user logs in to the airline application using his local account details (here John_Airline). The Airline application 34 contacts the IDP 32 and federates the accounts. The process can then be repeated for the user's account at the hotel application (John_Hotel).

After the identities John_IDP, John_Airline and John_Hotel are federated, the IDP 32 and the airline and hotel applications make entries in their respective user records about the identity by which the user 30 is known at the different locations.

To ensure privacy of the user, opaque handles may be used. For example, the IDP 32 stores information regarding two federated applications, namely the airline application 34 and the hotel application 36. The IDP may store user aliases for login purposes; for example, a user alias of "asdWeRtT" might be used for the airline application and a user alias of "fGTZhgfr" might be used for the hotel application. Thus, in order to login to the hotel application, the IDP arranges for the user "fGTZhgfr" to be logged in; this limits the amount of information about the user that is known to the hotel application 36.

FIG. 4 shows how the arrangement described above can be used to implement a single-sign-on (SSO) service. FIG. 4 shows the transfer of messages between the user 30, IDP 32 and the airline application 34.

Initially, the user 30 sends a request to access the airline application 34. The user is not logged into the airline application 34 and so the airline application redirects the user to the IDP 32. (The method by which the service finds the IDP with which the user has an account is an implementation choice; for example, Liberty Alliance specifies a number of different options for this purpose.)

The IDP 32 authenticates the user using the IDP account. When this is done, the IDP retrieves the handle of the user for the airline application (here "asdWeRrT") and redirects the user to the airline application along with an authentication assertion that confirms to the airline application that the user was authenticated by the IDP 32. The airline application 34 checks the authentication assertion and based on the handle provided by the IDP, retrieves the local account of the user at the airline and proceeds to serve the user with his local account at the airline application.

With the user 30 now logged in at the IDP 32, any attempt by the user to access his account at the hotel application 36 would result in the IDP providing the appropriate credentials to the hotel application without the user needing to provide any further details or information.

The arrangement described above is one of many schemes for implementing a SSO function. The IP-Multimedia Subsystem (IMS) provides a different arrangement. IMS is being standardized by the 3GPP to merge the Internet and the cellular world in the $3^{rd}$ Generation (3G) mobile network for providing multimedia services. Details of the IMS system that are relevant to the present invention are discussed below.

Every IMS subscriber has two kinds of identities: a private user identity (IMPI) and a public user identity (IMPU). An IMS subscriber can have multiple private user identities which are in turn connected with multiple public user identities. A single IMPI can be connected to two different IMPUs as well. The IMPI is used for authentication purposes whilst the IMPU is used to identify the user at the different services provided inside the IMS and also for other users to contact the user via the IMS. The IMPI takes the form of a Network Access Identifier (NAI) (e.g. username@realm") whilst the IMPU is a SIP URI (e.g. "sip:user@domain").

The authentication process starts when the user wants to register one of his IMPUs in the IMS. Assume that the user wants to register his IMPU "sip:joe-pda@domain.com" in the IMS, so that a communication session initiated by any other IMS user trying to contact Joe using this SIP URI can be routed to the current IMS terminal that Joe is using.

As shown in FIG. 5, Joe begins by sending a registration request to the IMS which is intercepted by the Proxy Call Session Control Function (P-CSCF). This is then forwarded to the Interrogating Call Session Control Function (I-CSCF). The I-CSCF contacts the Home Subscriber Server (HSS) to find out which Serving Call Session Control Function (S-CSCF) the request has to be routed to. The registration request is then forwarded by the I-CSCF to an S-CSCF. The S-CSCF contacts the HSS to retrieve the authentication vectors associated with the user based on the IMPU. The HSS checks if the IMPU being registered belongs to the IMPI (the register request carries both the IMPI and IMPU of the user). If valid, the HSS returns the authentication vectors to the S-CSCF. The S-CSCF sends a challenge to the IMS terminal in an "unauthorised" response. A challenge may, for example, be a random number generated by the HSS and forwarded by the S-CSCF (see, for example, the IMS AKA protocol defined in 3GPP TS 33.203).

The IMS terminal receives the unauthorised response and calculates a response to the challenge present in it, for example in accordance with the IMS AKA protocol defined in 3GPP TS 33.203. The response is included in a second register request sent to the network. This is routed to the S-CSCF which can check the response to its challenge. If correct, the S-CSCF informs the HSS that the IMS terminal is registered with it and an OK response is sent to the IMS terminal.

Once a user is registered by the IMS, he is allowed to use all the services which he is authorised to use within the trust domain of the IMS, without the need for re-authentication. When a service inside the trust domain receives an access request, it is able to verify that the user has been authenticated by the IMS. Thus, Single-Sign-On (SSO) is achieved by the IMS via the passing of a network asserted identity, i.e. all the services inside the IMS trust the underlying IMS authentication and authorisation process.

The HSS stores all the public user identities used by the user for various services. The list is created when the user subscribes to the services inside the IMS. The HSS resembles the IDP in Liberty Alliance, but with partly different functionality. In IMS, all the public user identities of the user are known to the HSS (i.e. federated). This is done is a quasi-static way, where the public user identities associated with a user subscription are entered by the operator either on subscription, or later in customer management. On accessing a service, the user chooses one of his public identities for usage with the service. On the contrary, in Liberty Alliance, the user has the choice of which identities and services he wants to federate at the IDP quite dynamically and solely under his own control. In addition, the Liberty Alliance IDP stores an association between services and identities of the user he intends to use at each single service.

Another difference is that the user must explicitly "register" his public user identities (IMPUs) that he wishes to use in the IMS during a registration session before he can access the service. This can either be done by a registration request for that particular IMPU or automatically done when the user registers any of his IMPUs in the IMS. In the latter case, where multiple IMPU registrations are triggered by a single IMPU registration, the IMPUs that are registered are called "implicitly registered IMPUs" and are controlled by the user settings which the user might change. With Liberty Alliance, authentication is done during the process of accessing the application server itself.

When a user wants to use a service via IMS, the user may include the preferred identity (IMPU) that he wants to access that service in his access request. If a preferred identity is given, this is checked by the P-CSCF to see if the IMPU as indicated by the user has already been registered by the IMS. If so, the request is forwarded to the S-CSCF, asserting the identity preferred by the user. If a preferred identity is not given, then the P-CSCF asserts a default identity if the user is registered at all. If the user is not registered, then the request is rejected. The P-CSCF uses either the preferred identity or the default identity as the so-called "P-asserted-identity" in IMS.

The further handling of the request depends on the way the user accesses the application server.

If the application server is accessed via the IMS Service Control (ISC) interface, the request is checked by the S-CSCF against the user's service profile that is maintained by the HSS which lists for the IMPU the associated specific services. These services are then accessed, where the application server learns the authenticated public user identity from the P-asserted-identity header in the request. Since the S-CSCF uses the P-Asserted-Identity header when checking whether the User Equipment (UE) originating request matches the initial filter criteria provided the HSS, the P-asserted-identity inserted by the P-CSCF determines which services and applications are invoked. This is in contrast to Liberty Alliance, where the IDP automatically chooses the correct identity (or pseudonym) associated with the service based on the service that is being accessed by the user.

Alternatively, if the application server is accessed as a server terminating the user request (terminating user agent addressed by "To" URI), the S-CSCF forwards the request to the server without special handling. As long as the application server is within the trust domain of the IMS operator, the application server may learn the authenticated public identity of the user by inspecting the P-asserted-identity header in the request. Also here the user may select the intended user identity used for the service by himself, which is in contrast to the Liberty Alliance behaviour, where the IDP selects the related user identity for the requested service based on previous identity federation.

As discussed above with reference to Liberty Alliance, open networks such as Liberty Alliance networks use an identity provider (IDP) that is responsible for making sure that a requesting application gets the correct identity of the user from multiple identities that a user may have federated with the IDP. Many existing solutions allow the user to choose which identities are federated with the IDP.

The situation is different when we consider the case of closed networks, such as a mobile network. Here, the user is known by an identity which is fixed (e.g. a telephone number) and which is accepted only by services running inside the closed network. Even in the case of IMS (which is a closed network) where the users are allowed to have multiple identities within the network to use at different services or for different purposes, these identities are valid only for services inside or coupled to the trust domain of the IMS. Currently, there are only limited solutions for Identity Federation and SSO techniques whereby a user can federate his closed network identity with another identity that belongs to him in a trust domain outside his operator's IMS trust domain.

The present invention seeks to address at least some of the problems outlined above.

The present invention provides a method comprising the steps of: a user requesting access to an application via a first trust domain (such as an IP Multimedia Subsystem or another network); an adapter module accessing an account of the user at an identity provider, wherein the adapter module is within the first trust domain, and wherein the identity provider is within a second trust domain (such as a Liberty Alliance Circle of Trust); the adapter module obtaining said user's user credentials for the application from the identity provider, wherein the application is within the second trust domain; and using the user credentials for the application to provide the user with access to the application. The adapter module and the application may be federated at the identity provider to form at least part of a circle of trust. In some forms of the invention, either: the adapter module is within both the first trust domain and the second trust domain; or the identity provider is within both the first trust domain and the second trust domain. In some forms of the invention, the adapter module is within the first trust domain and outside the second trust domain and the identity provider is within the second trust domain and outside the first trust domain.

Thus, the present invention may enable an adapter module to impersonate the user when communicating with the identity provider. Thus the adapter module forms a bridge between the first trust domain (via which the user is seeking access to the application) and the second trust domain (including both the identity provider and the application). Similarly, the adapter module may impersonate the user when communicating with the application.

Further, in the present invention, the identity provider may not need to re-authenticate the user to issue federated identity credentials and/or assertions, since the first trust domain (e.g. a closed network, such as IMS) provides the underlying authentication of the user.

The present invention also provides an adapter module adapted to enable a user to access an application via a first trust domain, wherein the adapter module is within the first trust domain and the application is within a second trust domain, wherein the adapter module is configured to: access an account of the user at an identity provider at which the user has an account, wherein the identity provider is within the second trust domain; obtain said user's user credentials for the application from the identity provider; and enable the user to access the application. The adapter module and the application may be federated at the identity provider to form at least part of a circle of trust, such as a Liberty Alliance Circle of Trust.

The present invention further provides a system comprising a network and an adapter module, wherein: the network is within a first trust domain and outside a second trust domain; the adapter module is within the first trust domain; a user of the system has an account with the network; the user has an account with an application, which application is within the second trust domain; the user has an account with an identity provider, which identity provider is within the second trust domain; and the adapter module is configured to access the account of the user at the identity provider and to obtain the user's user credentials for the application from the identity provider. The system may further comprise the said application.

The present invention yet further provides a system comprising an adapter module and an identity provider, wherein: the adapter module is within a first trust domain; the identity provider is within a second trust domain; a user of the system has an account with the identity provider; the user has an account with an application, which application is within the second trust domain; and the adapter module is configured to access the account of the user at the identity provider and to obtain the user's user credentials for the application from the identity provider. The user may have an account with a network, which network is within the first trust domain and outside the second trust domain. The system may further comprise the said network. The system may further comprise the said application.

The present invention also provides a system comprising a network, an adapter module and an identity provider, wherein: the network is within a first trust domain and outside a second trust domain; the adapter module is within the first trust domain; the identity provider is within the second trust domain; a user of the system has an account with the network and an account with the identity provider; the user has an account with an application, which application is within the second trust domain; and the adapter module is configured to access the account of the user at the identity provider and to obtain the user's user credentials for the application from the identity provider. Thus, the adapter module of the system enables the user to access the application via the network by providing a bridge between the first and second trust domains.

The present invention further provides a computer program product adapted to enable a user to access an application via a first trust domain, wherein the computer program product is within the first trust domain and the application is within a second trust domain, wherein the computer program product is configured to: access an account of the user at an identity provider at which the user has an account, wherein the identity provider is within the second trust domain; obtain the user's user credentials for the application from the identity provider; and use the user credentials to provide the user with access to the application.

By making use of the present invention, users of trust domains with established authentication infrastructure, but with restricted identity management functions, may be able to use the full features of identity management for service/application access (such as identity federation, provisioning of user profiles, identity resolution) within the trusted domain and outside the trusted domain.

Furthermore, the selection of authenticated user identities based on the accessed service may be enabled in systems where normally only user-selected or network-selected user identities are authenticated.

Also, widespread and easy-to-deploy usage of user-defined and user-managed user profiles and attributes may be enabled in systems where such profiles or attributes were not previously available or were available only for certain well-defined services.

In some forms of the invention, the adapter module is within both the first and the second trust domains. In other forms of the invention, the adapter module is within the first trust domain, but outside the second trust domain. In some forms of the invention, the identity provider is within both the first and the second trust domains. In other forms of the invention, the identity provider is within the second trust domain, but outside the first trust domain. In some forms of the invention, the adapter module is within both the first and second trust domains and the identity provider is within the second trust domain and outside the first trust domain. In other forms of the invention, the identity provider is within both the first and the second trust domains and the adapter module is within the first trust domain and outside the second trust domain. In some forms of the invention, either the adapter module is within both the first trust domain and the second trust domain or the identity provider is within both the first trust domain and the second trust domain. In yet other forms of the invention, the adapter module is within the first trust domain and outside the second trust domain and the identity provider is within the second trust domain and outside the first trust domain.

In some forms of the invention, the adapter module is located in a domain trusted by the user, identity provider and application so that it can handle user credentials and assertions.

In some forms of the invention, the adapter module is trusted by the identity provider to the extent that the identity provider accepts an asserted identity from the adapter module without requiring further user credentials.

In many implementations of the invention, the user has an IMS account, an account at an identity provider and an account at the application. Thus, the user is able to access the application via the IMS, even if the service is not in the IMS trust domain, due to the presence of the adapter module, which module acts as a glue by making it appear to the identity provider that the user is accessing directly and not via the IMS. Thus, the access to the application by the adapter module via the identity provider operates in the same way as any ordinary Single-Sign-On arrangement under a protocol such as the Liberty Arrangement.

In many forms of the invention, the identity provider and the application need no modification in order to work with the present invention. Thus, many of the elements of the system of the present invention are existing elements.

The first trust domain may be a closed network, such as an IP Multimedia Subsystem (IMS). The user may request access to the application from an IMS terminal. The second trust domain may be an open network. The second trust domain might be a circle of trust (e.g. a Liberty Alliance Circle of Trust) or the Internet. In an arrangement consisting of an IMS network and a Liberty Alliance identity provider, the adapter module may exchange the IMS credential of the user with one that is accepted by the application. By using the present invention, users of closed service platforms/networks (or walled gardens) may be able to access services outside their closed networks by means of identity federation.

In some forms of the invention, the network is considered to be "closed" if it has one or more of the following characteristics:

Restricted or no automated user manageability of user identities and user profiles and attributes.

Usage of identities which are known or valid in closed domains only.

No automated federation mechanisms of different identities.

No selection by servers of user identities based on context or different attributes.

No access to user profile/attributes in open environments.

In some forms of the invention, the adapter module is located within the trust domain of an IMS network so that the adapter module is able to receive the P-asserted identity header. In some forms of the invention, the identity provider accepts the P-asserted identity header as identifying the user, without requiring further user credentials.

In some forms of the invention, the user has an account with servers in both the first and second trust domains.

In some embodiments of the invention the application is within the first trust domain. In other embodiments of the invention, the application is outside the first trust domain.

In some forms of the invention, the adapter module is adapted to obtain data required to access the account of the user at the identity provider. By way of example, a database may be provided to enable the adapter module to obtain data required to access the account of the user at the identity provider. The database may provide data concerning the location of the identity provider and/or user credentials (e.g. a username and/or a password) required to access the identity provider. In some forms of the invention, the database is within the first trust domain. In some forms of the invention, the database is within the first trust domain and outside the second trust domain.

In some forms of the invention, the location of the identity provider is obtained from the service being accessed. In some forms of the invention, the user identification required by the identity provider is the P-asserted-identity included in a service access message sent from an IMS network to the adapter module. In some forms of the invention, the adapter module receives all the data required to obtain user credentials from the identity provider, without needing to access further data stored in a database.

The adapter module may perform protocol and/or format translations between an authenticating network (such as IMS) and other services, such as an identity provider or an application. The adapter module may perform protocol and/or format translations between the first and second trust domains.

The present invention also provides a computer-readable medium, in which a computer program is stored which, when being executed by a processor, is adapted to control or carry out a method as discussed above.

Embodiments of the invention are described below, by way of example only, with reference to the following numbered Figures.

Figure 1:
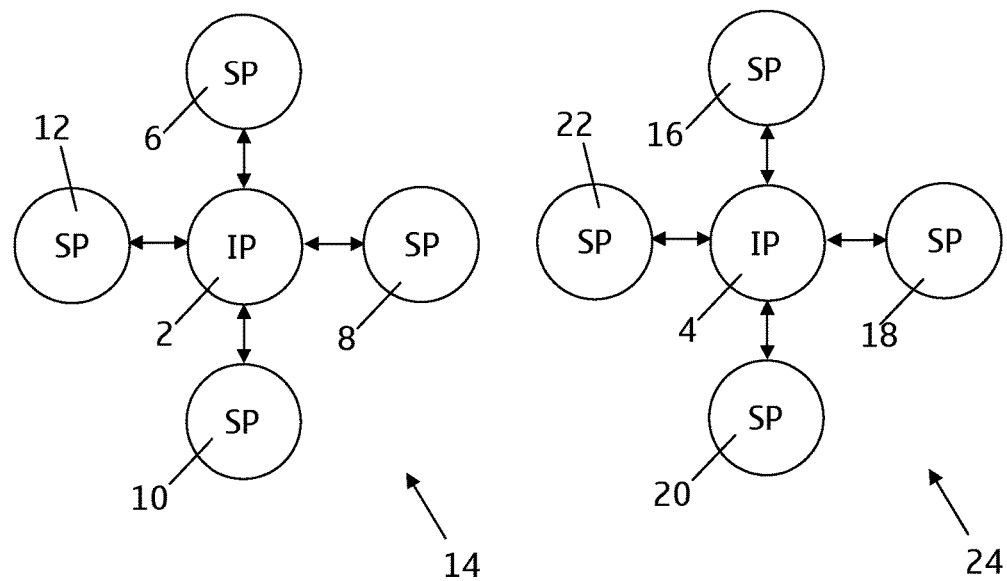
FIG. 1 is a block diagram demonstrating the principle of Identity Federation.
Figure 2:
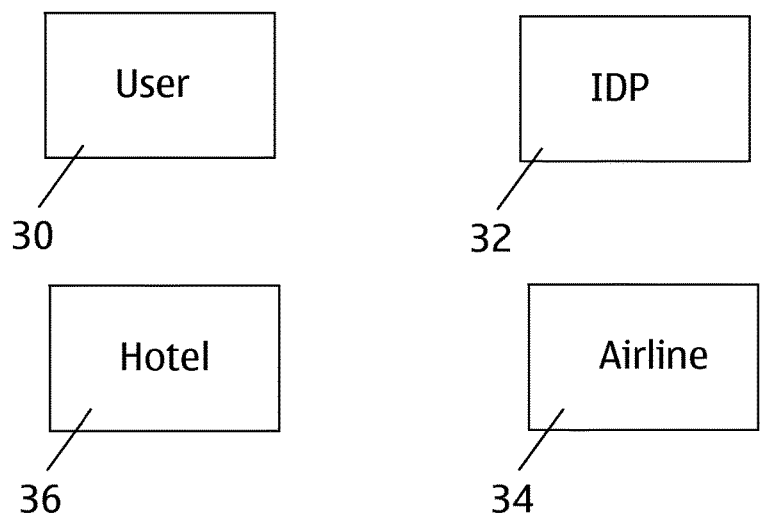
FIG. 2 is a block diagram of a system showing an exemplary process for federating user accounts within the same Circle of Trust.
Figure 3:
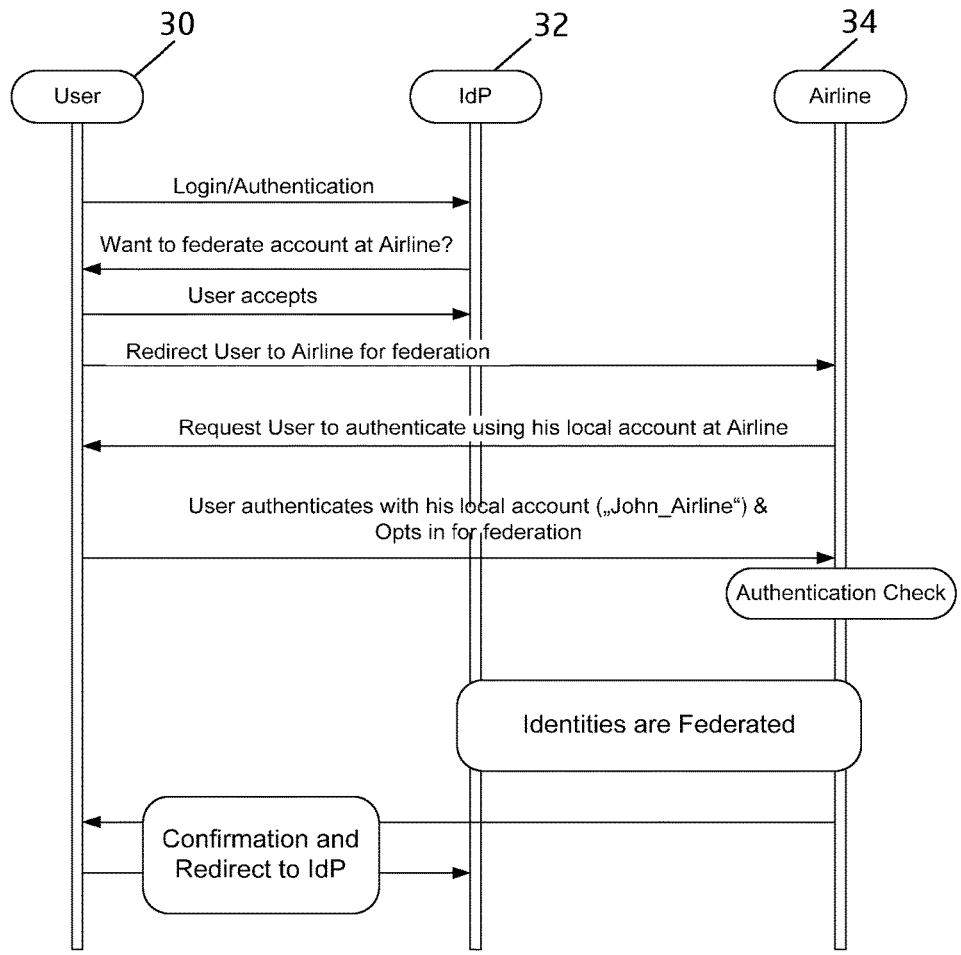
Figure 4:
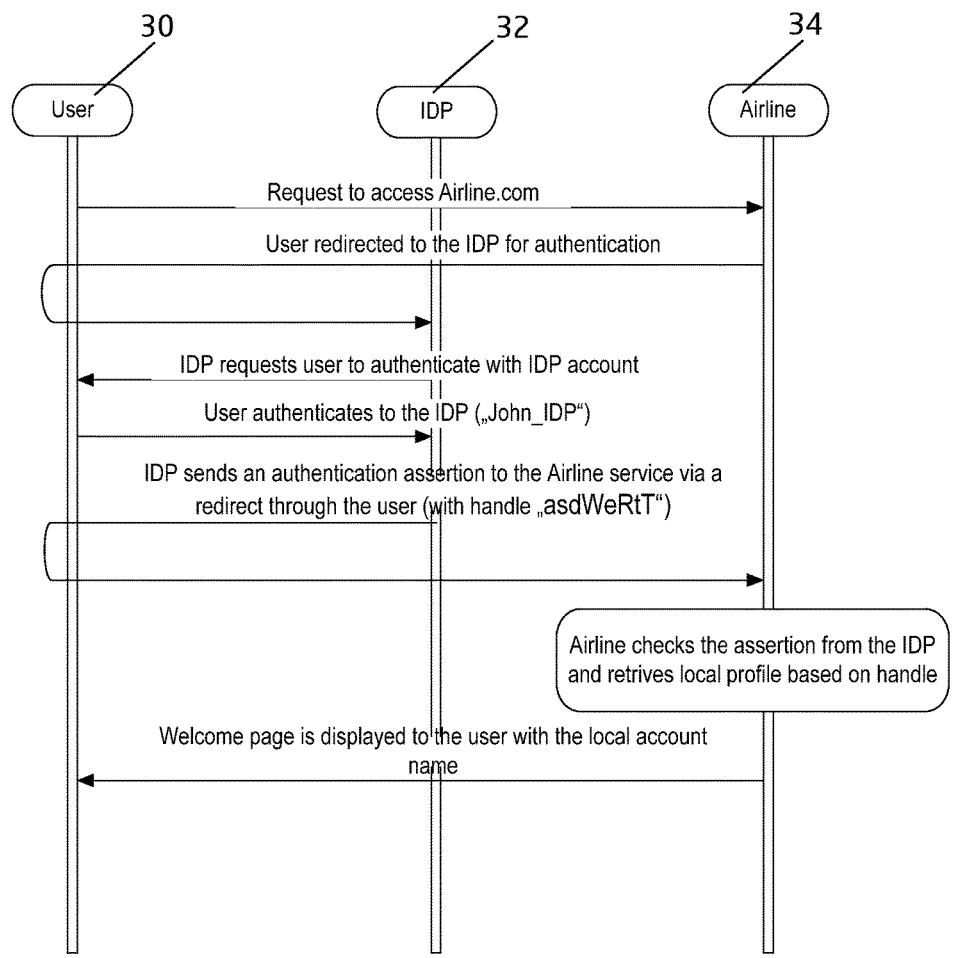
Figure 5:
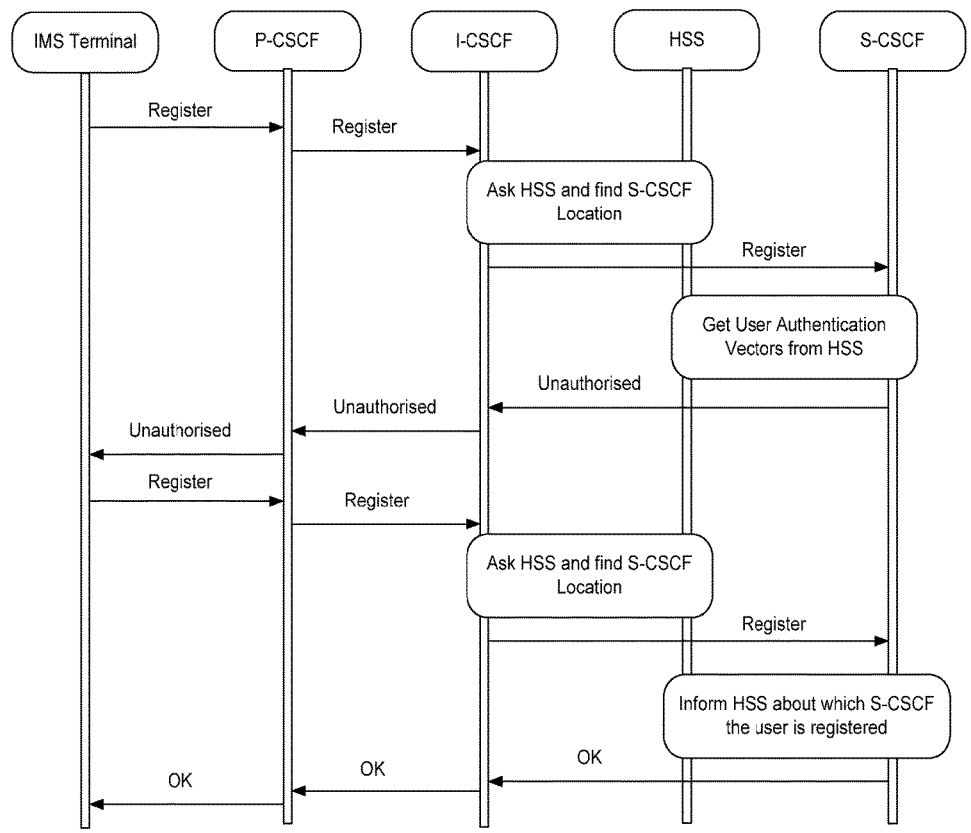
Figure 6:
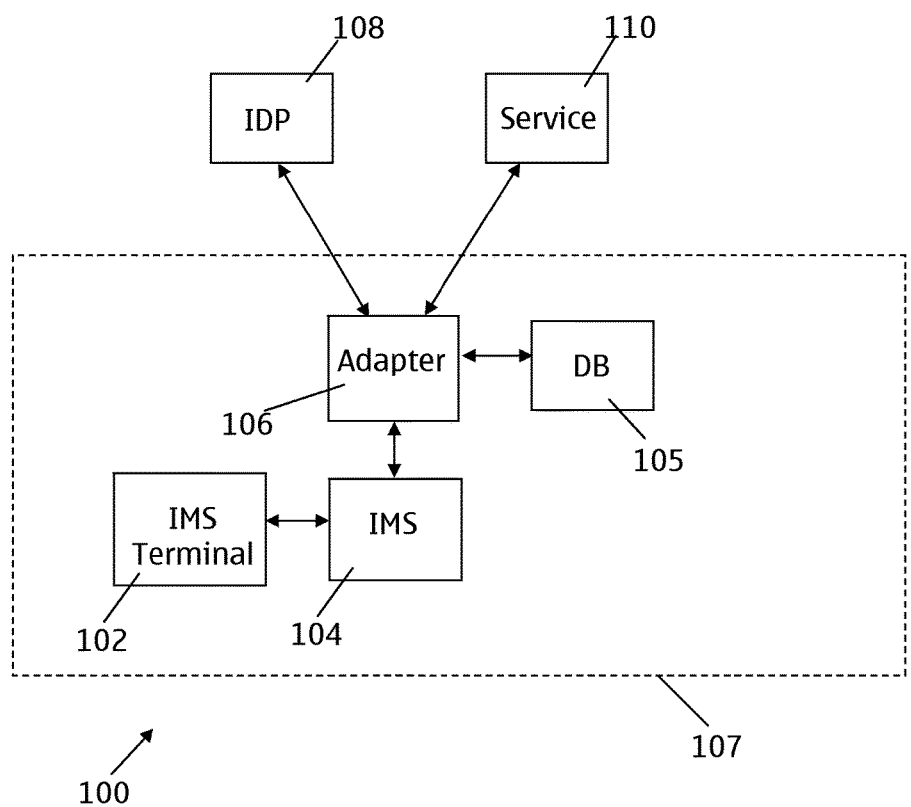
Figure 7:
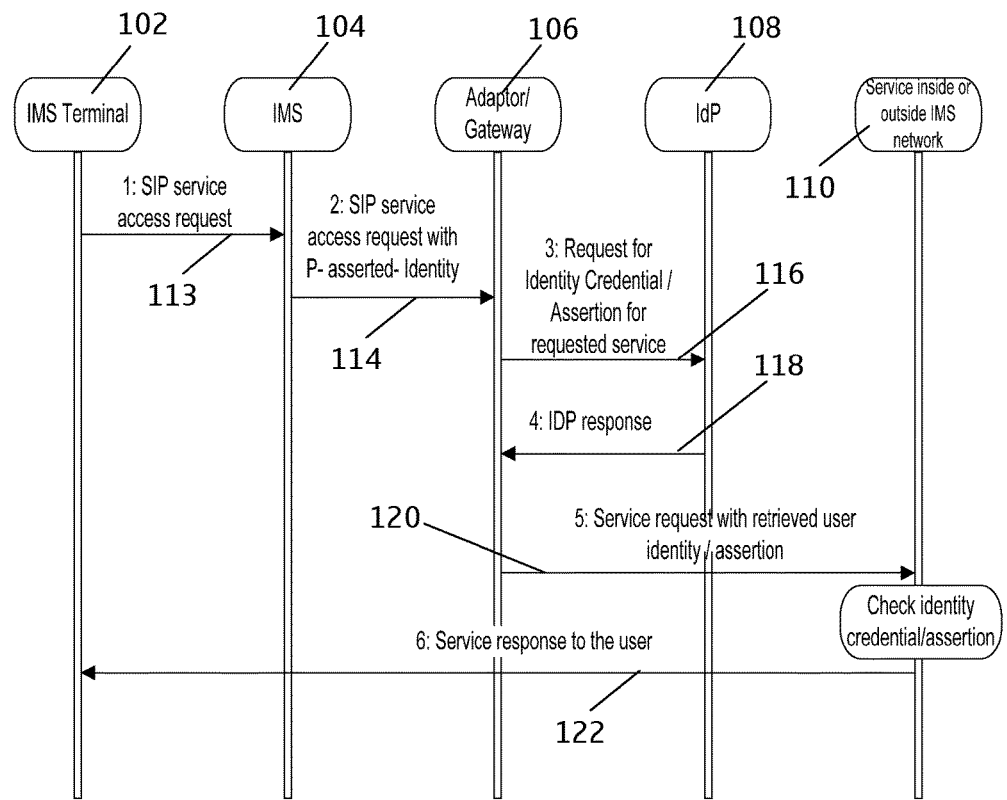
Figure 8:
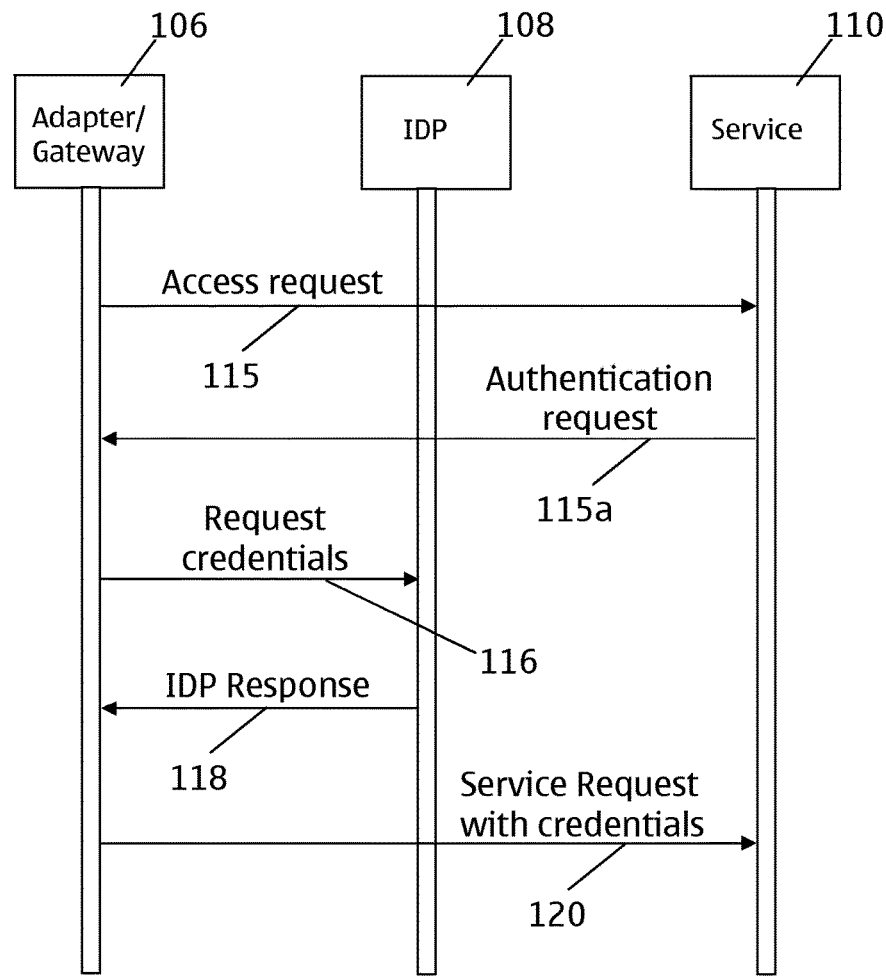

FIG. 3 demonstrates the federation of a user's account at an identity provider;

FIG. 4 demonstrates an exemplary SSO algorithm;

FIG. 5 demonstrates an algorithm for authenticating an IMS terminal;

FIG. 6 is a block diagram of a system in accordance with an aspect of the present invention;

FIG. 7 shows a message sequence in accordance with an aspect of the present invention; and FIG. 8 shows a message sequence in accordance with a further aspect of the present invention.

FIG. 6 is a block diagram, indicated generally by the reference numeral 100, of a system in accordance with an aspect of the present invention. The system 100 comprises an IMS terminal 102, an IP Multimedia Subsystem (IMS) 104, an adapter/gateway module 106, a database 105 associated with the adapter/gateway module, an Identity Provider (IDP) 108 and a service or application 110. (The adapter/gateway module 106 is often referred to below as an adapter module. Further, the terms "service" and "application" are both used to refer to the application that the user is seeking to access.)

The IMS terminal 102, IMS 104, adapter module 106 and database 105 are all within a trust domain 107 of the IMS system. In the example of FIG. 6, the IDP 108 and the service 110 are outside the trust domain 107.

Assume that a user at the IMS terminal 102 has an account at the service 110 and that the user also uses the IDP 108 to federate his individual accounts at different services (such as the service 110). To accomplish this, the user may create an account at the IDP 108 using one of his IMPUs from the IMS 104 as the username. The user is known by one of his IMPUs and this identity may be used by the adapter/gateway module 106 to exchange user credentials with the IDP 108, as discussed in detail below. Alternatively, the username at the IDP 108 may be different from an IMPU of the user, in which case the adapter/gateway module 106 stores a mapping between the IMPU and the username at the IDP (for example using the database 105). After an account has been created at the IDP 108, the user can choose to federate his services at the IDP as discussed above.

Consider the scenario in which the user at the IMS terminal 102 attempts to access the service or application 110 through the IMS 104. Assuming that the communication inside the IMS 104 is via SIP, the IMS terminal issues a SIP INVITE message to the service 110. An exemplary message sequence is described below with reference to FIG. 7.

The user sends a request to access the service 110 from the IMS terminal 102 to the IMS 104, as indicated by the arrow 113 in FIG. 7. The request 113 may be in the form of a SIP INVITE message to the service 110. The service URI may be entered by the user at the terminal 102, or may be inserted by the IMS 104 based on the user profile at the IMS. As discussed above, the user may indicate his preferred public identity, or the IMS may select a default identity. Further on, the user is identified in this request inside the trust domain of the IMS by the P-asserted-identity header which is inserted by the P-CSCF. This header also asserts the authenticity of the identity.

Next, the S-CSCF sends the user request (the SIP INVITE message) to the adapter/gateway module 106 (step 114 in FIG. 7). The adapter/gateway module 106 is responsible for forwarding the user request to the IDP 108 so that the IDP can retrieve the correct identity credential/assertion of the user that will be accepted by the service 110. The adapter/gateway module 106 is also responsible for any protocol translation that has to be done to access the service since all traffic inside the IMS is based on SIP, while it is possible that the service 110 (which may be outside the IMS) may support another kind of protocol (e.g. http). It should be noted that the adapter/gateway module 106 is inside the trust domain of the IMS network so that it may receive the P-asserted identity header within the user request.

The adapter/gateway module 106, using the P-asserted-identity issued by the IMS 104, queries the database 105 containing the user account information for the IDP 108 to retrieve both the location of the IDP and the relevant user account information. It should be noted that inside the IMS, whenever a user issues a SIP INVITE message to access a service, he may include an IMPU to be used for accessing the service. If no IMPU is selected by the user, the IMS selects a default IMPU to be associated with such requests. This feature can be used to make sure that the IMPU corresponding to the username at the IDP is attached to the SIP request. In this case, the adapter/gateway module 106 only needs to get the corresponding password (if required) from the database. If the IDP 108 does not require a password, then the database 105 may be omitted from some implementations of the invention. In the general case, where the user can have accounts at multiple IDPs, such a default IMPU can be used to query a database, along with the requested service ID to find the associated IDP and the corresponding user account information. The user must have updated the database accordingly with IDPs and associated services in the first place for this to work.

The adapter/gateway module 106 now has the user account information and the location of the IDP 108. The adapter/gateway module impersonates the user and requests the appropriate credentials from the IDP 108 for accessing the service 110 (step 116). Hence the IDP need not be modified to work with the IMS 104. Often, the IDP 108 trusts the IMS to have authenticated the user (i.e. the IDP 108 relies on the P-asserted-identity sent to if by the adapter/gateway module 106). Therefore, the additional user authentication step performed by an IDP in Liberty Alliance is not needed, as the IDP has an "indirect" authentication session with the user. In such an arrangement, the adapter module 106 may simply send the P-asserted identity of the user to the IDP 108, possibly with an indication of the desired service.

The IDP 108 authenticates the user (here the adapter/gateway module 106) either implicitly (if the adapter/gateway module is connected to the IDP by a common secure channel) or based on the user-specified credentials provided. The IDP 108 responds with the requested credentials for the service 110 (step 118).

The adapter/gateway module 106 receives the identity credential/assertion of the user for the service 110 from the IDP 108 and constructs a request to the service based on the interface supported by the network hosting the service. This request (which includes the credentials required to access the service) is sent to the service 110 (step 120).

The service 110 receives the identity credential/assertion and checks for its correctness. Once the validity of the credential/assertion is established, the user 102 is given access to the service 110 (step 122).

In the arrangement described above with reference to FIG. 7, the adapter module 106 obtains user credentials from the IDP 108 before contacting the service 110. This is not essential. FIG. 8 shows a variant of the arrangement of FIG. 7 in which the service 110 is contacted by the adapter module 106 before the user credentials have been obtained from the identity provider 108.

In the example of FIG. 8, the steps 113 and 114 described above with reference to FIG. 7 have already taken place. Thus, a service access request has been issued by the IMS terminal 102 and a SIP service access request sent by the IMS 104 to the adapter module 106.

Next, as shown in FIG. 8, the adapter module 106 sends an access request to the service 110 (step 115). In response to the access request, the service returns a response indicating the user has not been authenticated (step 115a). The response includes an authentication request and may also include a redirection command, for example in the form of an HTTP location header, indicating the address of the IDP 108 and indicating the name by which the service is known at that IDP.

The adapter module 106 then sends (automatically in some embodiments) the request (including the authentication request issued by the service 110) to the identity provider 108 (step 116). It should be noted that the location of the identity provider may be provided by the service 110 and so the database 105 may be omitted in some embodiments.

The message sequence of FIG. 8 then proceeds as described above with reference to FIG. 7, with the identity provider returning user credentials for the service to the adapter module (step 118) and the adapter module requesting access to the service, including the user credentials in that access request (step 120).

In the arrangements described above, messages between the IMS terminal 102 and the IMS network 104 are protected by the security mechanisms described in the IMS specifications. The connection between the IMS network 104 and the adapter/gateway module 106 may be protected by appropriate means (e.g. TLS/IPSec). As the adapter/gateway module is within the trust domain of the IMS, security mechanisms as specified for use within one trust domain are applied.

The adapter/gateway module 106 may authenticate itself to the IDP 108 so that the IDP knows that the request comes from a legitimate source. This can be done, for example, using IPSec or TLS with certificates based on a Public Key Infrastructure, or it can be configured such that there exists a dedicated secure connection between the gateway/adapter module and IDP and all messages on this connection are trusted and secure. Alternatively, the adapter/gateway module could keep user credentials for each user, which are used towards the IDP for each user separately.

When the adapter/gateway module 106 sends a service access request to the service 110 with the identity credentials/assertions acquired from the IDP 108, the message may be secure. If the service 110 requests a secure connection from the user (e.g. https), then the adapter/gateway module may establish such a connection on behalf of the user by acting as a proxy.

As many credentials used for authentication and single-sign-on are valid by possession, the adapter/gateway module 106 is able to impersonate the user, as the adapter/gateway module plays the role of the user with respect to the service 110. This also requires that the adapter/gateway module is in a trusted domain. The domain should be trusted by the user and by the service. Thus, placement of the adapter/gateway module in the IMS network trusted domain is appropriate. However, the adapter/gateway module 106 may also be part of two trust domains (acting as a gateway between them), as there are two different functions related to different trust domains:

1. The reception of the P-asserted-identity header requires the adapter/gateway module to be located in the IMS trust domain; and
2. The handling of user credentials and assertions requires the adapter/gateway module to be located in a domain trusted by the user.

Thus, the adapter module 106 may be located within both the first and the second trust domains and an identity provider 108 may be located within the second trust domain, but outside the first trust domain; however, this is not essential. For example, the identity provider could be provided within both the first and second trust domains. In such an arrangement, the adapter module could be provided within the first trust domain and outside the second trust domain. Alternatively, the identity provider and the adapter module could both be within both the first and second trust domains. In the arrangement described above, the adapter module 106 is in the IMS trust domain and is also in a domain trusted by the user, the IDP 108 and the service 110. In some embodiments, it is not essential that the adapter module be in a domain trusted by the IDP 108 and the service 110. Thus, the adapter module may, in some embodiments, be within the first trust domain and outside the second trust domain, and the IDP may be within the second trust domain and outside the first trust domain.

The embodiments of the present invention described above describe the interworking of an IMS network and Liberty Alliance identity management for application server access. The invention is not limited to such an arrangement. The underlying principles are equally applicable to the interworking of general purpose identity management systems (e.g. Liberty Alliance, OpenID, and other proprietary systems) with a trust domain (e.g. IMS) which has a well established authentication infrastructure, but is restricted or limited in some ways, for example in one or more of the following respects:

Restricted or no automated user manageability of user identities and user profiles and attributes.

Usage of identities which are known or valid in closed domains only.

No automated federation mechanisms of different identities.

No selection by servers of user identities based on context or different attributes.

No access to user profile/attributes in open environments.

It should be noted that in order to provide the user with the possibility of executing initializing procedures and to manage his identity federations at the IDP, a direct access of the user to the IDP may be required. If the user has access to the IDP only indirectly via a closed network (such as IMS) then some other management access of the user to the IDP may be required.

For authenticated access to the IDP for management purposes, the following methods may be applied:

1. If there is a common secure channel between the adapter/gateway module 106 and the IDP 108, then all requests from the user to the IDP may be sent over this channel without further authentication, as the IDP can rely on the adapter/gateway module to only forward asserted identities.
2. If the communication between the adapter/gateway module and the IDP is via separately authenticated channels for each user, then for a user who has an account at the IDP, the same authentication mechanism as for normal access to IDP may be applied. If the user does not yet have an account with the IDP, then there is a need for the adapter/gateway module to have separate access to the IDP, e.g. with adapter/gateway module specific credentials, to send requests to create a new user account for an IMS user.

The embodiments of the invention described above are illustrative rather than restrictive. It will be apparent to those skilled in the art that the above devices, systems and methods may incorporate a number of modifications without departing from the general scope of the invention. It is intended to include all such modifications within the scope of the invention insofar as they fall within the scope of the appended claims.

The invention claimed is:

1. A method of enabling a user to access an application via a first trust domain within a closed network, the method comprising the steps of:
   accessing an account of the user at an identity provider via an adapter module, wherein the adapter module is within the first trust domain and the identity provider is within a second trust domain, wherein the second trust domain is located outside the closed network;
   obtaining user credentials of the user for the application from the identity provider, wherein a server on which the application operates is within the second trust domain; and
   using the user credentials for the application to provide the user with access to the application,
   wherein when the user credentials at the identity provider are different from a user identity of the user in the first trust domain, the adapter module stores at the adapter module a mapping between the user identity and the user credentials, and wherein the user identity in the first trust domain is fixed and used by services running in the first trust domain within the closed network.

2. The method as claimed in claim 1, wherein either:
   the adapter module is within both the first trust domain and the second trust domain; or
   the identity provider is within both the first trust domain and the second trust domain.

3. The method as claimed in claim 1, wherein:
   the adapter module is within the first trust domain and outside the second trust domain; and
   the identity provider is with the second trust domain and outside the first trust domain.

4. The method as claimed in claim 1, wherein the first trust domain is an IMS network.

5. The method as claimed in claim 1, wherein the adapter module is configured to obtain data required to access the account of the user at the identity provider.

6. The method as claimed in claim 5, wherein the step of obtaining the data required to access the account of the user at the identity provider via the adapter module further comprises obtaining a location of the identity provider.

7. The method as claimed in claim 5, wherein the step of the obtaining the data required to access the account of the user at the identity provider via the adapter module further comprises obtaining user credentials required to access the account of the user at the identity provider.

8. The method as claimed in claim 1, wherein the adapter module performs protocol and/or format translation between the first trust domain on the one hand, and the identity provider and/or the application on the other hand.

9. An adapter module configured to enable a user to access an application via a first trust domain within a closed network, wherein the adapter module is within the first trust domain and a server on which the application operates is within a second trust domain, wherein the second trust domain is located outside the closed network, and wherein the adapter module is configured to:
   access an account of the user at an identity provider at which the user has an account, wherein the identity provider is within the second trust domain;
   obtain said user credentials of the user for the application from the identity provider; and
   enable the user to access the application,
   wherein when the user credentials at the identity provider are different from a user identity of the user in the first trust domain, the adapter module stores at the adapter module a mapping between the user identity and the user credentials, and wherein the user identity in the first trust domain is fixed and used by services running in the first trust domain within the closed network.

10. The adapter module as claimed in claim 9, wherein the adapter module is within the second trust domain.

11. The adapter module as claimed in claim 9, wherein the identity provider is within the first trust domain.

12. The adapter module as claimed in claim 9, wherein the adapter module is configured to obtain data required to access the account of the user at the identity provider.

13. The adapter module as claimed in claim 12, wherein the adapter module is configured to obtain the data required to access the account of the user at the identity provider from a database.

14. The adapter module as claimed in claim 12, wherein the data required to access the account of the user at the identity provider includes user credentials for the account.

15. The adapter module as claimed in claim 9, wherein the adapter module is configured to perform protocol and/or format translation between the first trust domain on the one hand and the identity provider and/or the application on the other hand.

16. A system comprising a closed network and an adapter module, wherein:
   the closed network is within a first trust domain and outside a second trust domain;
   the adapter module is within the first trust domain;
   a user of the system has an account with the closed network;
   the user has an account with an application, wherein a server on which the application operates is within the second trust domain;
   the user has an account with an identity provider, which identity provider is within the second trust domain; and
   the adapter module is configured to access the account of the user at the identity provider and to obtain said user credentials of the user for the application from the identity provider,
   wherein when the user credentials at the identity provider are different from a user identity of the user in the first trust domain, the adapter module stores at the adapter module a mapping between the user identity and the user credentials, and wherein the user identity in the first trust domain is fixed and used by services running in the first trust domain within the closed network.

17. A system comprising an adapter module and an identity provider, wherein:
   the adapter module is in a first trust domain within a closed network;
   the identity provider is located in a second trust domain, wherein the second trust domain is located outside the closed network;
   a user of the system has an account with the identity provider;

the user has an account with an application, wherein a server on which the application operates is within the second trust domain; and the adapter module is configured to access the account of the user at the identity provider and to obtain said user credentials of the user for the application from the identity provider, wherein when the user credentials at the identity provider are different from a user identity of the user in the first trust domain, the adapter module stores at the adapter module a mapping between the user identity and the user credentials, and wherein the user identity in the first trust domain is fixed and used by services running in the first trust domain within the closed network.

18. An apparatus, comprising:

at least one hardware processor; and at least one memory including a computer program product, wherein the at least one memory and the computer program product are configured to, with the at least one processor, cause the apparatus at least to:

access an application via a first trust domain within a closed network, wherein the computer program product is within the first trust domain and a server on which the application operates is within a second trust domain, wherein the second trust domain is located outside the closed network;

access an account of the user at an identity provider at which the user has an account, wherein the identity provider is within the second trust domain;

obtain user credentials of the user for the application from the identity provider; and use the user credentials to provide the user with access to the application, wherein when the user credentials at the identity provider are different from a user identity of the user in the first trust domain, the adapter module stores at the adapter module a mapping between the user identity and the user credentials, and wherein the user identity in the first trust domain is fixed and used by services running in the first trust domain within the closed network.

19. A non-transitory computer-readable medium, in which a computer program is stored which, when being executed by a processor, is configured to control or carry out a method of enabling a user to access an application via a first trust domain within a closed network, the method comprising the steps of:

accessing an account of the user at an identity provider via an adapter module, wherein the adapter module is within the first trust domain and the identity provider is within a second trust domain, wherein the second trust domain is located outside the closed network;

obtaining user credentials of the user for the application from the identity provider, wherein a server on which the application operates is within the second trust domain; and using the user credentials for the application to provide the user with access to the application, wherein when the user credentials at the identity provider are different from a user identity of the user in the first trust domain, the adapter module stores at the adapter module a mapping between the user identity and the user credentials, and wherein the user identity in the first trust domain is fixed and used by services running in the first trust domain within the closed network.

\* \* \* \* \*